Patented June 10, 1952

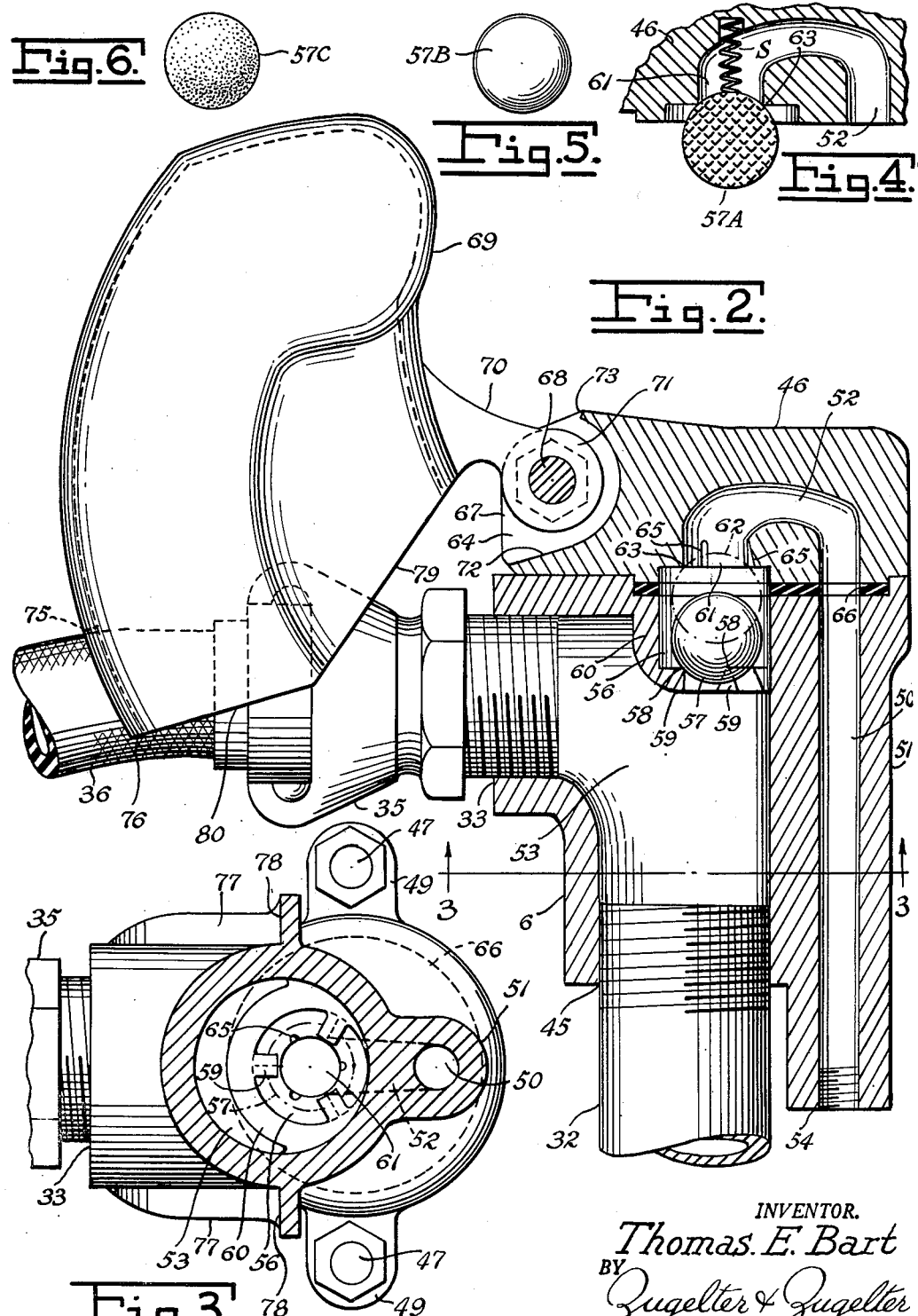

2,600,187

UNITED STATES PATENT OFFICE 2,600,187

WATER SERVICE FIXTURE

Thomas E. Bart, Cincinnati, Ohio, assignor to The Murdock Mfg. & Supply Co., Cincinnati, Ohio, a corporation of Ohio Application April 11, 1947, Serial No. 740,813

2 Claims. (Cl. 137—13)

The present invention relates to a water service fixture incorporating an improved construction providing maximum protection against freezing in various climates, and against pollution by back-siphonage and cross connection between the potable water supply and all extraneous sources of waste or filth.

An object of the invention is to provide a fixture designed especially to overcome all objections and meet all requirements of public health bureaus charged with the responsibility of protecting the public health against danger resulting from pollution of potable water distribution systems.

Another object is to provide a water service fixture which is anti-freezing and pollution-proof, notwithstanding the presence of a length of flexible hose attached to the fixture spout and lying on the ground or platform surrounding the fixture.

Another object is to preclude back-siphonage through a hose attached as stated in the preceding object, as a condition to preserving the anti-freezing and anti-pollution characteristics of the fixture.

A further object is to provide a device of the character referred to, which is simple and inexpensive, and thoroughly reliable in the performance of its anti-freezing and anti-polluting functions.

Another object is that of reducing to an absolute minimum the number of moving parts in a fixture of the character stated, while at the same time providing a construction capable of withstanding severe usage and abuse in service.

Another object of the invention is to provide for vibratory movement of a part within the fixture, to overcome any freezing tendency.

A further object is to adapt the fixture to efficient use in various climates, by means of a simple part replacement.

The foregoing and other objects are attained by the means described herein and illustrated upon the accompanying drawings, in which:

Fig. 2 is an enlarged cross-sectional view of the hydrant head of the fixture, incorporating a novel vacuum-breaking freeze-resisting auxiliary flow control means.

Fig. 3 is a cross-sectional view taken on line 3—3 of Fig. 2.

Fig. 4 is a fragmental cross-sectional view of the auxiliary flow control means in modified form.

Fig. 5 is an elevational view of a smooth sphere or ball to be substituted for the roughened sphere or ball shown in Fig. 4, in adapting the fixture to different climatic conditions.

Fig. 6 is an elevational view of another type of sphere or ball employed.

Figure 1:
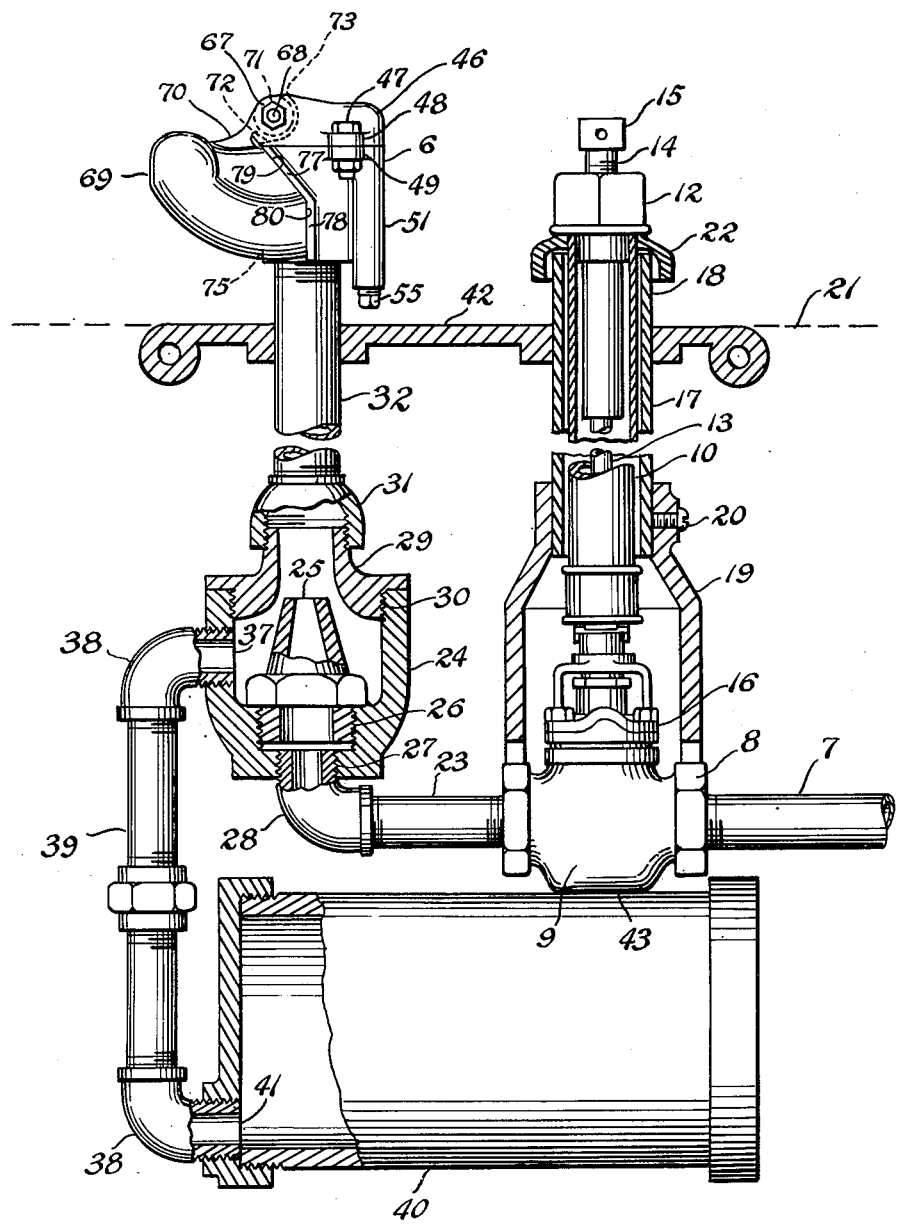
Fig. 1 is a fragmental elevational view, partly in cross-section, showing the improved anti-freezing sanitary fixture of the invention.

To ensure potable water service fixtures against back-siphonage and other pollution-inducing action, and against freezing at low temperatures, has heretofore been a vexatious problem to those engaged in the business of providing water distribution systems for certain localities, such as in railroad yards and other centers of activity where the surroundings are not particularly sanitary. The most effective known solution to the problem mentioned has been disclosed in my pending application for U. S. Patent Serial No. 691,138, now Patent No. 2,545,911, March 20, 1951, filed August 16, 1946, of which the instant application is a continuation in part. The device of said pending application is equally as effective in its functions of avoiding freezing and pollution, as the device disclosed herein. The instant device, however, includes refinements and improvements which enhance the fixture in other respects, such as its adaptability to various climates with greater convenience of usage, and greater conservation of water used incident to operation of the device, as well as other improvements to be disclosed hereinafter.

Referring to Fig. 1, the hydrant head is indicated at 6, and 7 indicates the fresh water supply pipe conveying potable water from a main of the public water distribution system. The supply pipe is connected to a valve 8, which may be of any suitable type. The valve shown is of the general type disclosed in the patent of S. J. Nordstrom, No. 1,781,821, dated November 18, 1930. The many advantages of such a valve are specified in the patent aforesaid, and in various other patents of the same inventor. The valve 8 alternatively may be of the type shown in another of my co-pending applications, Serial No. 694,601, entitled "Water Service Fixture," and filed on September 3, 1946.

Briefly stated, the valve shown in Fig. 1 comprises a body 9 and an operating tube or stem 10, the upper end 12 of which is squared to receive a wrench by which the valve plug may be turned to open or close the valve, it being understood that the lower end of the tube or stem 10 is suitably secured to a valve plug encased within the valve body 9 to insure its opening and closing upon rotation of the squared end 12. The valve 8 is lubricated with a heavy immiscible grease forced under pressure through a central tube 13, by means of a threaded member 14, which upon being screwed down, forces the said grease into lubricating grooves of the valve plug. The head 15 of the member 14 may be squared to receive a wrench for turning said member as lubrication is required. The valve plug is held in its seat by means of a bonnet 16. A protective casing 17 is provided, which may be of any desired length, the upper end 18 of which may extend above ground level, and the lower end of which may be secured to a housing 19 by means of a screw 20. A protective hood or baffle 22 may be provided for the purpose of substantially precluding entry of water, dirt, or other extraneous matter into the casing 17 and housing 19. It is to be understood, of course, that the valve 9 is disposed underground, below the frost line, the ground level being indicated at 21.

Into the outlet port of the valve 8 is threaded a connecting pipe 23 whereby water passing through the valve is conveyed to the constricted nozzle 25 of an ejector. The ejector may be of any acceptable type, the example illustrated comprising a body 24 internally bored and threaded as at 26 and 27 to retain the base of the nozzle 25 and the threaded end of the pipe fitting 28 respectively. The head of the ejector, indicated at 29, may threadedly engage the body at 30, and will be properly shaped interiorly to assist the nozzle in performing the desired ejector action. By means of a suitable coupling 31, or otherwise, the discharge port of the ejector head may be connected to an upright pipe section 32 to be hereinafter referred to as the riser. The upper end of the riser carries the hydrant head 6, through which water from the riser may be discharged, the discharge end 33 of the head being threaded to receive any suitable type of quick-acting hose coupling 35, shown in Fig. 2, to which a flexible hose 36 may be attached. Under certain circumstances, however, it may be desirable to affix a pipe or conduit to the head 6, in place of the hose coupling device 35.

It will be noted that the body of the ejector has an auxiliary port 37 through which may gravitate any water remaining in the riser 32 upon closing the valve 8. By means of the elbows 38 and an intermediate length of pipe 39, water from the riser is conveyed to a suitable tank or reservoir 40 which is tightly capped at its opposite ends so as to avoid all possibility of passage of fluid either into or from the reservoir, except through the port 41 thereof. Port 41 preferably is located at the lowest possible point of the tank interior, so that the ejector action which occurs about the nozzle 25 when the valve 8 is opened will result in a withdrawal of substantially all water within the reservoir. Little or no water, therefore, will be found within the reservoir as long as there is a flow of water upwardly through the riser.

It is important to note that the interior of the reservoir 40 is never exposed to water other than the potable water which may drain from the riser 32, wherefore it may be accurately stated that the reservoir forms part of the potable water supply line. Regardless of how often water may enter and leave the reservoir 40, it will never carry contamination or pollution into the operating elements of the hydrant head or supply line, so long as the water coming through the fresh water supply line 7 is pure and clean. The reservoir and ejector, like the valve 8, are buried in the earth below the frost line so as to prevent freezing during the winter season.

To produce a serviceable and durable structure, omitting the objectionable features of a service box at platform level, a heavy plate 42 is arranged to support the riser 32 and the casing 17 of the valve structure in spaced relationship approximately at ground or platform level. For additional support, the valve body 9 may be welded or otherwise fixed to the top of the reservoir, as indicated at 43 in Fig. 1. It may here be noted that the riser 32 and the casing 17 may extend to any desired elevation above ground or platform level.

The hydrant head 6, as detailed in Figs. 2 and 3, comprises a hollow casting of substantially elbow shape, the ports 45 and 33 of which are internally threaded to receive the upper threaded end of the riser 32 and the hose coupling member 35, respectively. A cover member 46 surmounts the head, being secured thereon by means of bolts 47 extending through laterally disposed ears 48 and 49, which may be formed integrally with the cover and head, respectively. The vertical passage 50 within the integral extension 51 of the head 6, together with the cored channel 52 in the head, constitutes part of a vacuum breaker which provides exceedingly free communication between the outside atmosphere and the interior 53 of the hydrant head. The lower end 54 of the passage 50 may be plugged, as at 55 of Fig. 1, for disabling the vacuum breaker during moderate weather when the service fixture is in no danger of freezing.

Within the hydrant head 6 is a cage or chamber 56, in which is confined a vertically shiftable valve member, preferably in the form of a ball 57, the function of this ball being to close or substantially close the vacuum breaker passages when the ball is elevated by pressure of water within the head, and to provide for free and ample intake of air through the same passages when the ball is lowered, with water pressure in the head at atmospheric or sub-atmospheric value. Depending upon the nature or character of the ball 57, and/or one of its seats, the water service fixture can be adapted for different types operation which are suitable to various climatic conditions. For example, in very cold climates it will be desirable to arrange for more or less leakage of water past the ball and to the exterior of the fixture, through the vacuum breaker passages 52 and 50, in order to avoid ice formation in the head during use of the fixture; whereas in climates where freezing is only mild and occasional, the ball valve arrangement may be such as to permit no leakage of the character mentioned. In either case, however, the ball must operate to permit a free and voluminous intake of air through the passages 50 and 52 whenever the pressure of water in the head is relieved by reason of the manual closing of main valve 8, in order to avoid back-siphonage of water from the hose or conduit 36.

Normally, or when the fixture is inoperative, ball 57 rests upon spaced stops or lugs 59 at the lower end of the cage, to permit free and unrestricted air communication between the interior of the head and the outside atmosphere, through passages 52 and 50. On the other hand, pressure of water introduced into the head through the riser elevates the ball into contact with an upper annular seat 63, to seal or substantially seal said passages against leakage of water from the interior of the head. The ball is free to shift from one position to the other, depending on the presence or absence of water pressure within the head chamber 53.

As was previously mentioned, it may be desirable in very cold climates, to arrange for more or less leakage of water past the ball valve while the fixture is in use, to avoid formation of ice within the head thereof. This may be accomplished in various ways, two of which are suggested by Figs. 2 and 4. In accordance with Fig. 4, the ball 57A is roughened exteriorly as by knurling, grooving, pitting, or otherwise, so that the ball may never seat perfectly upon the annular edge 63 of port 61. Under such circumstances, pressure of water maintaining the ball in elevated position will be relieved partially through the passageway 52, to an extent determined by the degree to which the outer surface of the ball has been roughened or mutilated. In the alternative form illustrated by Fig. 2, the ball 57 has a smooth outer surface to seat upon the annular edge 63 of port 61, and the desired amount of leakage past the ball is obtained by providing one or more notches 65 in the annular edge or seat 63. The annular seat is formed upon cap or cover 46, as shown, and serves to confine the ball within the chamber 56, the seat being disposed in substantial axial alignment with the vertical axis of the chamber and at an elevation above the ball. It is necessary, of course, that the diameter of the seat 63 shall be substantially smaller than the diameter of the ball, which in turn is substantially smaller in diameter than the diameter of chamber 56. The space about the ball provides for an ample circulation of air and water thereabout.

From the foregoing it will be understood that as the main valve 8 is opened, pressure of water in the hydrant head interior will force the ball 57 upward to imperfectly close the port 61, as indicated by the broken lines 62 upon Fig. 2. Leakage of water past the ball, either by the method of Fig. 2 or that suggested by Fig. 4, will prevent the ball from freezing to its seat 63 in extremely cold weather. This leakage may have to be appreciable in very cold climates, and will continue as long as the main valve is open. Upon closing of the main valve, the ball will drop onto the spaced lugs 59, permitting a voluminous rush of air to enter the hydrant head through the vacuum breaker passages 50—52, for precluding back-siphonage of water from hose 36 into the riser 32. As the riser water gravitates into the reservoir 40, it is important that water from the hose be precluded from siphoning back into the riser, as the capacity of reservoir 40 preferably is limited and therefore will not accommodate a much greater amount of water than that of the riser. In other words, the object is to preclude the possibility of water filling the reservoir and standing in the riser above the frost line.

The foregoing amply explains the operation of the water service fixture in either of the forms illustrated by Figs. 2 and 4, wherein leakage of water from the head is provided for to preclude freezing while the fixture is operating. Assuming now that one of the fixtures is to be installed in a mild climate where freezing is infrequent and of short duration, it may be considered unnecessary to provide for leakage about the ball. Under such circumstances, therefore, a perfectly smooth surfaced ball such as is shown at 57B of Fig. 5, would be incorporated as a substitute for the roughened ball 57A of Fig. 4. A ball such as 57B resting against the continuous annular seat 63 of Fig. 4, will permit little or no leakage of water through the vacuum breaker passages 52 and 50. As another alternative a ball such as 57C may be substituted in the assembly, this being a ball of rubber or other material having resilient or rubber-like qualities. The resilient ball may be found effective in all climates, including those which are severely cold, since the resiliency thereof will tend to dislodge the ball from the upper annular seat 63 as soon as pressure of water has been relieved within the head by closing the main valve 8. By the very nature of the resilient ball material, it will resist freezing and adherence to the annular seat 63. In other words, the ball 57C will be of a material which is an insulator for heat and cold. The several balls 57, 57A and 57B likewise may be of an insulating material such as fiber, hard rubber, or any of the modern plastics. It is immaterial to the operation of the fixture, whether the balls normally float or sink in water. The outer surface of ball 57C preferably is smooth or has a skin rendering it impervious to water, unless such ball is to be used for the leakage purposes indicated by Figs. 2 and 4.

As was previously stated herein, it is important that the ball valve when lowered, shall permit a copious intake of air through passages 50 and 52 for vacuum-breaking. The cage chamber 56 accordingly is made amply large, and the lugs 59 which normally support the ball are so spaced and dimensioned as to permit substantial inflow of air to chamber 53 of the head. In order that the ball may not freeze to the lugs 59 while the fixture is not in use, the lugs are provided with sharp corners 58 in order to reduce to a minimum the points of contact on the surface of the ball. The lugs 59 accordingly are made substantially triangular in cross-section as shown. A further purpose in providing lugs which are triangular in shape, is to avoid the formation of flat surfaces on which water might stand and subsequently freeze, and thereby interfere with free shifting movement of the ball. From the foregoing, it will readily be appreciated that as the water supply is turned off at the main valve 8, water in the chambers 53 and 56 will gravitate through the riser 32 and into the reservoir 50, and any water on the lugs 59 will be shed promptly from the upwardly converging side walls of the triangular lugs. The lugs may be integral with the head casting.

It may here be stated that in a fixture of the kind herein referred to, it is possible to effect rapid vibration of the shiftable ball by gauging the diameter of chamber 56 to the diameter of the ball experimentally, to produce a form of water hammer capable of keeping the ball in motion as long as a substantially constant pressure of water is maintained within the head chamber 53. By taking advantage of this phenomenon, the producer of the fixture may obtain such activity of the ball within its cage, as will effectively preclude the formation of ice about the annular seat 63. A fixture so constructed will automatically relieve some portion of the water pressure from head chamber 53, permitting a desired discharge through the vacuum breaker discharge passages 52 and 50.

During the milder seasons of the year when freezing presents no problem to the operation of the fixture, the vacuum breaker passages 50 and 52 may be closed as by means of a plug 55, and in that event the main valve 8 will remain open to maintain pressure of water within the entire fixture, including the hose 36, which hose at its far end will carry a valved nozzle similar to that generally applied to gasoline dispensing pump hoses. Under such circumstances, flow of water from the fixture will be controlled at the free end of hose 36, by the attendant or operator using the fixture. The presence of plug 55 closing the vacuum breaker passages, renders the ball valve arrangement inoperative during the summer season. When not in use, the hose may be permitted to rest upon the ground, generally at a lower elevation than the head of the fixture.

As an aid to preventing freezing of any ball upon its seat 63 during use of the fixture, some form of yielding means such as a compression spring S (Fig. 4), may be desirable to urge the ball from its seat when pressure is absent from the head.

For purposes of sanitation and anti-pollution, a hood is furnished as indicated at 69 of Figs. 1 and 2. A pair of spaced parallel lips 67, to form a mouth 64, may be cast integrally with the head 6 and provided with a transverse bore to receive a hinge pin or bolt 68 for hingedly mounting the hood 69 so that it may be raised and lowered, as shown by Figs. 2 and 1, respectively. The hood is hollow as indicated, and is sufficiently wide to pass over the hose coupling member 35 when lowered to the covering position of Fig. 1. A frangible neck 70, integral with the hood, carries a perforate lug 71 through which the pin or bolt 68 passes. The lower portion of the mouth 64 may be sloped as indicated at 72, while the upper portion may be brought forwardly to form an abutment 73, against which the neck 70 of the hood may abut in limiting its upward movement, so that it may not tilt upwardly beyond dead center and thereby remain in open position. The hood 69, therefore, is self-closing, and when the hose 36 is attached to the hydrant as in Fig. 2, the hood rests upon the hose at 75, where the leading edge 76 of the hood is arcuately cut away to fit the curvature of the head when closed, as in Fig. 1. The slope 72 in the mouth 64, prevents the accumulation of dirt and ice therein, thereby insuring free pivotal movement of the lug 71 at all times.

Along both sides of the head 6 are formed the laterally extending rib sections 77 and 78, which provide abutments for the edge portions 79 and 80 of the hood when lowered to the Fig. 1 position. As a result of this fitting of the hood 69 to the head 6, a substantial closure is effected for protecting the coupling member 35 when not in use, so that contaminating matter from the toilet hoppers of passing cars may not reach the vital parts of the hydrant head and induce pollution of the fresh water supply line which serves it.

The construction is foolproof, inexpensive, and easy to install and maintain, with a resultant saving in expense to the user. The device is sturdy and durable, and will resist ordinary abuse to the utmost for year round service. No drainage need be provided for, either to the ground or to a sewer, thus eliminating the possibility of pollution through direct or indirect cross connections with contaminated sources.

It is to be understood that various changes and modifications may be made in the structural details of the device, within the scope of the appended claims, without departing from the spirit of the invention.

What is claimed is:

1. A sanitary vacuum-breaking head for water service fixtures, comprising a body portion, a cover portion and a hood, said body portion including an inlet port and an outlet port interconnected by a conduit, a vacuum breaker passage in said body disposed between said inlet and discharge ports and communicating between the interior of said conduit and a vent port, said cover portion including a vacuum breaker passage one end of which terminates in a valve seat complementary to the vent port of said body portion, the other end of which is in communication with the atmosphere, an interferring member disposed in the vent port movable toward and from said seat in response to the presence or absence of fluid under pressure within said head, means operable for removably securing said cover to said head, said cover member being constructed and arranged to overlie a portion of said body in the region of the outlet port, said hood including a frangible neck portion terminating in a boss pivotally secured to said cover portion for controlling access to said outlet port.

2. A sanitary vacuum breaking head for water service fixtures, comprising a body portion including inlet and outlet ports, and a vacuum breaker passageway, a cover member secured to and carried by said body portion, said cover including a vacuum breaker passageway constructed and arranged to connect the vacuum breaker passageway of said body portion with the atmosphere, and a hood pivotally secured to said cover, said hood being constructed and arranged to normally assume a lowered position in housing relationship with said outlet port.

THOMAS E. BART.

REFERENCES CITED

The following references are of record in the file of this patent:

UNITED STATES PATENTS

| Number | Name | Date |
|---|---|---|
| 672,415 | Dodge | Apr. 16, 1901 |
| 1,349,062 | Goldberg | Aug. 10, 1920 |
| 1,756,976 | Ehlers | May 6, 1930 |
| 1,788,358 | Goerg | June 6, 1931 |
| 1,896,528 | Strong | Feb. 7, 1933 |
| 2,004,455 | Woolley | June 11, 1935 |
| 2,545,911 | Bart | Mar. 20, 1951 |

FOREIGN PATENTS

| Number | Country | Date |
|---|---|---|
| 7,520 | Germany | of 1879 |
| 9,043 | Austria | of 1902 |